(12) United States Patent
Seidenfeld et al.

(10) Patent No.: US 10,537,140 B2
(45) Date of Patent: Jan. 21, 2020

(54) RECHARGING CASE FOR USE WITH A VAPORIZATION DEVICE

(71) Applicant: Refuul, LLC, Brooklyn, NY (US)

(72) Inventors: Justin Seidenfeld, Brooklyn, NY (US); Cole Connolly, New York, NY (US)

(73) Assignee: Refuul, LLC, Brooklyn, NY (US)

( * ) Notice: Subject to any disclaimer, the term of this patent is extended or adjusted under 35 U.S.C. 154(b) by 0 days.

(21) Appl. No.: 16/278,657

(22) Filed: Feb. 18, 2019

(65) Prior Publication Data

US 2019/0320716 A1 Oct. 24, 2019

Related U.S. Application Data

(60) Provisional application No. 62/661,602, filed on Apr. 23, 2018.

(51) Int. Cl.
*A24F 47/00* (2006.01)

(52) U.S. Cl.
CPC .................. *A24F 47/008* (2013.01)

(58) Field of Classification Search
None
See application file for complete search history.

(56) References Cited

U.S. PATENT DOCUMENTS

| | | | |
|---|---|---|---|
| 2017/0027221 A1* | 2/2017 | Liu | A24F 15/18 |
| 2017/0302324 A1* | 10/2017 | Stanimirovic et al. | H04B 1/3888 |
| 2018/0271149 A1* | 9/2018 | Holtz et al. | A24F 47/00 |

* cited by examiner

*Primary Examiner* — Michael J Felton
*Assistant Examiner* — Katherine A Will
(74) *Attorney, Agent, or Firm* — Caldwell Intellectual Property Law

(57) ABSTRACT

A recharging case for a vaporization device includes a body having a proximal end and a distal end. A first channel in the body has an opening at the proximal end, and a terminal end near to the distal end. At the terminal end a charging component is configured to connect to a charging connector of a vaporization device inserted in the first channel and charge the vaporization device from an integrated power source in the body. A second channel in the body may store additional cartridges for use with a vaporization device inserted in the first channel.

17 Claims, 5 Drawing Sheets

RECHARGING CASE FOR USE WITH A VAPORIZATION DEVICE

CROSS REFERENCE TO OTHER APPLICATIONS

The present application claims the benefit of priority under 35 U.S.C. § 119 to U.S. Provisional Patent Application No. 62/661,602, filed Apr. 23, 2018, and entitled "Charging Case for Electronic Vaporizer", which is incorporated herein by reference in its entirety.

FIELD OF THE INVENTION

The present invention generally relates to the field of accessories for vaporization devices. In particular, the present invention is directed to a recharging case for use with a vaporization device.

BACKGROUND

Vaporization devices that use electricity to vaporize materials for inhalation are increasing popular among recreational consumers of various inhalable substances. Such vaporization devices typically include a rechargeable battery connected to an electronic circuit that heats or otherwise vaporizes a vaporizable substance to provide an active ingredient or flavor to a user in an aerosol form. The vaporizable substance, and in some cases a portion of the electronic circuit, are commonly provided in the form of cartridges; when the vaporizable substance in a current cartridge is exhausted, the now spent cartridge may be discarded and replaced with a new cartridge filled with vaporizable material. The vaporization device thus must be replenished in two separate ways, by replacement of cartridges and recharging the battery at a charging plug or the like. This arrangement can present disadvantages: battery life of the vaporization device may be limited, sometimes requiring a user to forego use until the battery can be plugged into a universal serial bus (USB) dock or similar accessory. The need to keep track of cartridges can also present challenges, as the cartridges are readily lost.

SUMMARY OF THE DISCLOSURE

In an aspect, a recharging case for use with a vaporization device includes a body having a proximal end, a distal end opposite the proximal end, a first lateral side, a second lateral side, and a longitudinal axis running from the proximal end to the distal end. The recharging case includes a first channel within the body running along the longitudinal axis, the first channel having a first opening at the proximal end and a terminal end opposite the first opening. The recharging case includes a charging component located at the terminal end of the first channel. The recharging case includes an integrated power storage device within the body, the integrated power storage device electrically connected to the charging circuit. The first channel is shaped to slidably admit a vaporization device having a mouthpiece at a first end and a charging connector at the second end. The charging component is configured to complete a circuit with the charging connector of the vaporization device when the vaporization device is inserted into the channel with the second end toward the distal end. The charging component is configured to charge the vaporization device using electrical power from the integrated power storage device via the charging circuit and charging connector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein include a personal vaporizer recharging case including a battery or other power storage device that may hold charge that is used to recharge a personal vaporizer unit. Recharging of the personal vaporizer unit may be managed by a charge controller that is part of case. When the case is holding a personal vaporizer unit, at least a portion of the personal vaporizer unit may be visible from the outside of case to allow a light emitted by personal vaporizer unit to provide a visual indication of a state of personal vaporizer unit. An additional channel may store spare or replacement cartridges to permit extended or varied use.

Figures 1, 2:
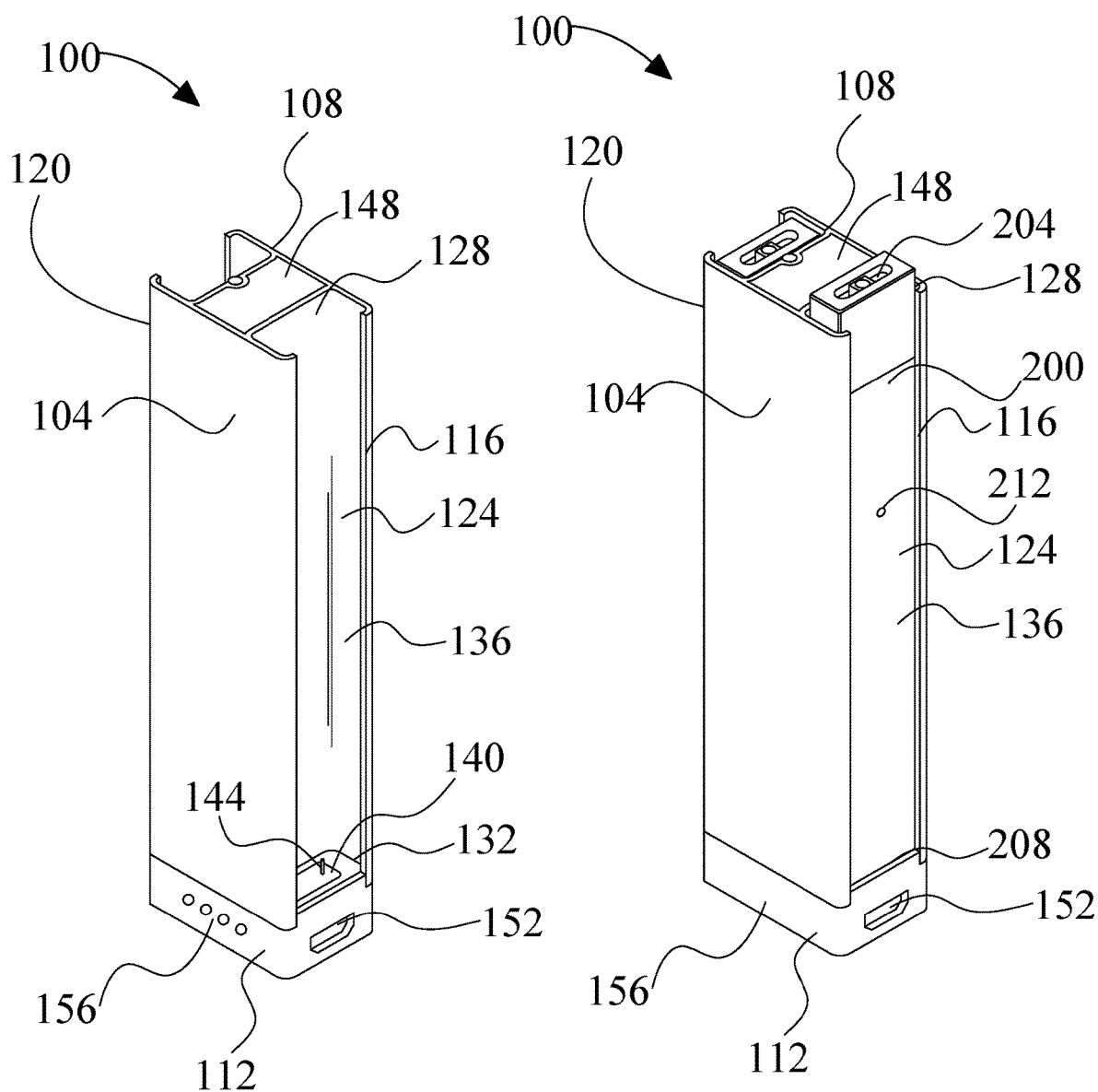
FIG. 1 is an isometric diagram of an embodiment of a recharging case.
FIG. 2 is an isometric diagram of an embodiment of a recharging case with a vaporization device.

Referring now to FIG. 1, an exemplary embodiment of a recharging case 100 for use with a vaporization device. Recharging case 100 includes a body 104. Body 104 may be constructed of any suitable material or combination of materials. For instance, and without limitation, body 104 may be constructed at least in part of metal, such as without limitation aluminum, steel, or the like. Body 104 may be constructed at least in part of plastic, such as without limitation polyvinyl chloride (PVC), high-density polyethylene (HDPE), acrylonitrile butadiene styrene (ABS), or the like. Body 104 may be composed at least in part of ceramic. Body 104 may be composed at least in part of composite material; as a non-limiting example, body 104 may be composed at least in part of fiberglass. Body 104 may be manufactured according to any suitable method or combination of methods, including without limitation casting, molding, subtractive processes such as machining, computer numerical control (CNC) machining, or the like, additive processes such as fused deposition printing, power-binder printing, selective laser sintering, stereolithography, or the like, lamination, coating, finishing, painting, polishing, engraving, anodization, assembly of parts through adhesion, engineering fits, fastening, fusing, or the like, or any combination thereof. Persons skilled in the art, upon reviewing the entirety of this disclosure, will be aware of various materials and/or material components usable to construct body 104 or other components of recharging case 100, as well as suitable methods or combinations of methods for manufacturing body 104, components of body 104, and/or any other component of recharging case 100 as consistent with the instant disclosure.

Still viewing FIG. 1, body 104 may have a proximal end 108, a distal end 112 opposite the proximal end 108, a first lateral side 116, a second lateral side 120, and a longitudinal axis running from the proximal end 108 to the distal end 112; longitudinal axis may define a direction from proximal end 108 to distal end 112, which may correspond, without limitation as a direction a user may interpret as "lengthwise" along body 104. Longitudinal axis may include, without limitation the direction along or within body 104 from proximal end 108 to distal end 112 and/or from distal end 112 to proximal end 108 along which a vaporization device is slid into or out of a first channel 124 as defined in further detail below.

With continued reference to FIG. 1, recharging case 100 includes a first channel 124 within the body 104 running along the longitudinal axis, the first channel 124 having a first opening 128 at the proximal end 108 and a terminal end 132 opposite the first opening 128. First channel 124 may be integral to body 104. First channel 124 may be formed in body 104 by any suitable manufacturing process as described above for manufacture of body 104, components of body 104, and/or components of recharging case 100. First channel 124 may have any suitable overall form for functions of first channel 124 as described in further detail below, including without limitation a form of a groove, a trough, a track, a depression, a furrow, a trench, a crease, and/or a gutter. First channel 124 may include walls that are either recessed into a surface body 104 or protrude from the surface where first channel 124 is formed. Internal side walls of the first channel 124 may form additional sides of first channel 124. Walls, sides, or other components of first channel 124 may partially enclose an interior space of first channel 124, where partial enclosure indicates sufficient enclosure of internal space to prevent insertion of vaporization device into first channel 124 or removal of vaporization device from first channel 124 except by sliding into or out of first opening 128. First channel 124 may have any suitable cross-sectional form to slidably admit a vaporization device as described in further detail below; cross-sectional form may be substantially uniform along a length of first channel 124, where "along the length" of first channel 124 means in a direction parallel to longitudinal axis and/or in a direction in which a vaporization device is slid into and/or out of first channel 124, or may vary along the length of first channel 124, for instance to snugly admit narrower portions of a vaporization device at one portion of first channel 124 while admitting broader portions of a vaporization device at another portion of first channel 124. First channel 124 and/or a part of section thereof may have any suitable cross-sectional form; for instance and without limitation first channel 124 and/or a part thereof may have a round, oval, square, rectangular, or other shaped cross section. First channel 124 may have a closed cross section; alternatively or additionally, part of first channel 124 may have an open cross-section, for instance where first channel 124 is connected to a gap as described in further detail below.

Still referring to FIG. 1, first channel 124 is shaped to slidably admit a vaporization device having a mouthpiece at a first end and a charging connector at a second end; in other words, first channel 124 may be adapted for slidably accepting a vaporization device. First channel 124 may fit snugly around a vaporization device which the first channel 124 is adapted to slidably admit; for instance, first channel 124 may form a slip fit with a vaporization device for which the first channel 124 is adapted, or a looser fit permitting slidable insertion. First channel 124 may have a flattened interior space shaped to admit a vaporizer having a flattened body 104. First channel 124 may be closed at the terminal end 132, such that, for instance, insertion of a vaporization device into first channel 124 until checked at closed terminal end 132 places the vaporization device into charging contact with recharging case 100 as described in greater detail below. In an embodiment, recharging case 100 may include an end-cap. End-cap may close off terminal end 132 of first channel 124. End-cap may contain or support one or more elements of recharging case 100 as described in further detail below, such as printed circuit boards, charging components 144, and the like. End-cap may be attached to body 104 in any suitable manner, including without limitation a press-fit, snap fit, adhesion, fusion, fastening, or the like; end-cap may be formed as an integral portion of body 104.

Referring now to FIG. 2, an exemplary embodiment of recharging case 100 with a vaporization device 200 inserted is illustrated; depiction and description of a vaporization device 200 and/or components thereof as provided in FIG. 2 and other figures presented in this disclosure is provided to indicate the manner in which recharging case 100, first channel 124, and/or other elements of recharging case 100 may interact with a vaporization device 200 and/or components thereof as set forth in further detail in this disclosure, and is not intended to indicate that vaporization device 200 and/or any component thereof makes up a part or component of recharging case 100 as described herein. A vaporization device 200 may alternatively or additionally be referred to as an "electronic cigarette," a handheld vaporization device 200. A vaporization device 200 may include a device designed and/or controlled in order to deliver a vapor with one or more properties to the user. For instance, and without limitation, a vaporization device 200 may be a device configured to extract for inhalation one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends. Chemicals may be used in vaporization device 200 in pure form and/or in combination or mixture with humectants that may or may not be mixed with plant material. Vaporization may be alternative to burning (smoking) that may avoid the inhalation of many irritating and/or toxic carcinogenic by-products which may result from the pyrolytic process of burning tobacco or botanical products above 300 degrees C. A vaporization device 200 may operate at a temperature at or below 300 degrees C.

With continued reference to FIG. 2, the term "vapor" may generally refer to a substance in the gas phase at a temperature lower than its critical point. The vapor may be condensed to a liquid or to a solid by increasing its pressure without reducing the temperature. Vapor may include an aerosol, where "aerosol" may generally refer to a colloid of fine solid particles or liquid droplets in air or another gas. Examples of aerosols may include clouds, haze, and smoke, including the smoke from tobacco or botanical products. The liquid or solid particles in an aerosol may have varying diameters of average mass that may range from monodisperse aerosols, producible in the laboratory, and containing particles of uniform size; to polydisperse colloidal systems, exhibiting a range of particle sizes. As the sizes of these particles become larger, they have a greater settling speed which causes them to settle out of the aerosol faster, making the appearance of the aerosol less dense and to shorten the time in which the aerosol will linger in air. Interestingly, an aerosol with smaller particles will appear thicker or denser because it has more particles. Particle number has a, much bigger impact on light scattering than particle size (at least for the considered ranges of particle size), thus allowing for a vapor cloud with many more smaller particles to appear denser than a cloud having fewer; but larger particle sizes.

Still referring to FIG. 2, a vaporization device 200 and/or cartridge may contain and/or vaporize a vaporizable material. A vaporizable material may be contained in a cartridge or the vaporizable material may be loosely placed in one or more cavities the vaporization device 200. Vaporizable material may include one or more flavors and/or active ingredient. Vaporizable material may include a humectant, where "humectant" may generally refer to as a substance that is used to keep things moist. A humectant may attract and retain moisture in the air by absorption, allowing the water to be used by other substances. Humectants are also commonly used in many tobaccos or botanicals and electronic vaporization products to keep products moist and as vapor-forming medium, Examples include propylene glycol, sugar polyols such as glycerol, glycetin, and honey.

Continuing to view FIG. 2, a vaporization device 200 may include various internal elements (not shown), including without limitation a reservoir configured to hold a vaporizable material, for instance as descried above and a heating element, which may include a resistive heater configured to thermally contact the vaporizable material from the reservoir. Internal elements may include an electric circuit that provides electricity to a heating element from a power source. A power source may include, without limitation, any device usable as a power storage device as described in further detail below, including without limitation a battery; a power source may be rechargeable. Internal elements may include one or more circuit elements providing and/or regulating electrical power from a power source to a heating element, including without limitation a microcontroller, a resistance measurement circuit connected to a microcontroller configured to measure the resistance of the resistive heater a sensor such as a heat sensor, a target resistance circuit configured to determine a target resistance, or the like.

Still referring to FIG. 2, a vaporization device 200 may include an "atomizer" or "cartomizer" configured to heat an aerosol forming solution (e.g., vaporizable material). The aerosol forming solution may comprise glycerin and/or propylene glycol. The vaporizable material may be heated to a sufficient temperature such that it may vaporize. An atomizer may be a device or system configured to generate an aerosol. An atomizer may include, without limitation, a small heating element that heats and/or vaporizes at least a portion of a vaporizable material and a wicking material that may draw a liquid vaporizable material in to the atomizer; a wicking material may comprise silica fibers, cotton, ceramic, hemp, stainless steel mesh, and/or rope cables, A wicking material may be designed and/or configured to draw liquid vaporizable material in to an atomizer without a pump or other mechanical moving part. A resistance wire may be wrapped around a wicking material and then connected to a positive and negative pole of a current source such as a power source as noted above; a resistance wire may include, without limitation, a coil, and when activated may have a temperature increase as a result of the current flowing through the resistive wire to generate heat. Heat may be transferred from a heating element to at least a portion of a vaporizable material through conductive, convective, and/or radiative heat transfer such that at least a portion of the vaporizable material vaporizes.

Continuing to refer to FIG. 2, as an alternative or additional element to the atomizer, a vaporization device 200 may include a "cartomizer" to generate an aerosol from the vaporizable material for inhalation by the user. A cartomizer may include a cartridge and an atomizer. A cartomizer may have a heating element surrounded by a liquid-soaked poly-foam that acts as holder for a vaporizable material, which may include without limitation a liquid. A vaporization device 200 may not have an atomizer or cartomizer, but may include an oven instead, which may be at least partially closed. An oven may have a closable opening. An oven may be wrapped with a heating element or may be in thermal communication with a heating element by means of another mechanism. A vaporizable material may be placed directly in an oven or in a cartridge fitted in the oven. A heating element in thermal communication with the oven may heat a vaporizable material mass in order to create a gas phase vapor, including without limitation through conductive, convective, and/or radiative heat transfer. Vapor may be released to a vaporization chamber where gas phase vapor may condense, forming an aerosol cloud having typical liquid vapor particles with particles having a diameter of average mass of approximately 1 micron or greater. In some cases the diameter of average mass may be approximately 0.1-1 micron.

Still referring to FIG. 2, air may be drawn into a vaporization device 200 to carry the vaporized aerosol away from the heating element, where it then cools and condenses to form liquid particles suspended in air, which may then be drawn out of the mouthpiece 204 by the user. Vaporization of at least a portion of a vaporizable material may occur at lower temperatures in the vaporization device 200 compared to temperatures required to generate an inhalable vapor in a cigarette. A cigarette may be a device in which a smokable material is burned to generate an inhalable vapor. The lower temperature of a vaporization device 200 may result in less decomposition and/or reaction of vaporized material, and therefore produce an aerosol with many fewer chemical components compared to a cigarette. In some cases, a vaporization device 200 may generate an aerosol with fewer chemical components that may be harmful to human health compared to a cigarette.

Continuing to refer to FIG. 2, vaporization device 200 may include a mouthpiece 204 located at a first end. A mouthpiece 204 may be an element of a vaporization device 200 through which a user inhales vapor, as described above. A mouthpiece 204 may include an aperture through which vapor is drawn when a user inhales, a passage through which vapor passes to the aperture, one or more inlets to permit passage of air through the mouthpiece 204, and/or any other suitable feature. Mouthpiece 204 may be tapered or otherwise shaped to fit in a user's mouth with ease and comfort.

Still referring to FIG. 2, a vaporization device 200 may include a charging connector 208 at the second end. A charging connector 208 may include any circuit or circuit element by means of which electric power may be transferred from a power source exterior to a vaporization device 200 to a power supply internal to the vaporization device 200, including without limitation an inductive charging coil whereby electrical power is transferred to the inductive charging coil using a varying exterior magnetic field supplied by another device or a conductive connection from the vaporizer to an exterior device. A non-limiting example of a conductive connection may include two or more charge contacts, which may be constructed of conductive material and accessible from an exterior surface of a device housing. Charge contacts may be in electrical communication with an energy storage device (e.g., battery) inside of a vaporization device 200 housing; charge contact pins 1901 may be visible on the exterior of the housing. When a vaporization device 200 is connected to a power source, for instance by insertion in recharging case 100 as set forth in further detail below, charging pins may facilitate electrical communication between the power storage device inside of the electronic vaporization device 200 and the power source outside of the housing of the vaporization device 200. Charging pins may be electrically connected to a power storage device via any suitable connection; for instance, and without limitation, charging pins may contact one or more conductive elements including springs, clips, and/or a printed circuit board (PCB). Charging pins may include male and/or female connectors; for instance, charging pins may include a "plug" that projects from a second end of a vaporization device 200, or may include holes into which a plug or one or more projecting conducting pins may be inserted. Charging pins on a vaporization device 200 may be agnostic as to whether they are current inlets or outlets; in other words, each of the charging pins on the device and the charging contacts on the cradle may be negative or positive. Charging pins on a vaporization device 200 may be reversible. Charging connector 208 may include a magnetic contact, as described in further detail below.

Continuing to refer to FIG. 2, a vaporization device 200 may include an indicator light 212. An indicator light 212 may include any light-emitting electronic component, including without limitation a light-emitting diode (LED). An indicator light 212 may indicate, without limitation, a charging status of a vaporization device 200; for instance, and without limitation, indicator light 212 may emit light while the vaporization device 200 is charging, and cease illumination when charging is complete, may emit a first color of light while charging is occurring and a second when charging is complete, may blink to indicate charging is currently occurring, or the like. Any suitable pattern of illumination in response to charging status of a vaporization device 200 may be used. An indicator light 212 may be located on a lateral side of a vaporization device 200 such that the indicator light 212 is visible through a window or opening in recharging case 100 body 104 as described in further detail below.

In an embodiment, and still referring to FIG. 2, a vaporization device 200 may include a replaceable cartridge. A cartridge may be detachable from vaporization device 200. In some embodiments, the cartridge receptacle and the detachable cartridge may form a separable coupling. In some embodiments the separable coupling may comprise a friction assembly. A vaporization device 200 may have a press-fit (friction) assembly between a cartridge pod and a device receptacle; separable coupling may also include a snap-fit or snap-lock assembly. As a further non-limiting example separable coupling may comprise a magnetic assembly. A cartridge may include one or more components included in a vaporization device 200 as described above, including without limitation a mouthpiece 204s, a vaporizer, a nebulizer, a cartomizer, an oven, a reservoir or supply of vaporizable material, a wick, or the like. A cartridge may include one or more electrical contacts that combine with electrical elements of another portion of vaporizing device to form a circuit to power elements of cartridge. A housing of a vaporization device 200 may further include a cartridge receptacle for receiving a cartridge; the cartridge receptacle may be shaped to receive an opened cartridge or "pod". A cartridge may be opened when a protective cap is removed from a surface of the cartridge. In some cases, a cartridge may be opened when a hole or opening is formed on a surface of the cartridge. A pod may be inserted into an open end of a cartridge receptacle so that as a non-limiting example, exposed contact tips of the pod make contact with contacts of a vaporizable device housing, thus forming an assembled vaporizing device.

Still referring to FIG. 2, first channel 124 may be located proximate to or at first lateral side 116 of body 104. First lateral side 116 may include one or more features allowing a user to view an indicator light 212 when a vaporization device 200 is inserted in first channel 124. For instance, first lateral side 116 may include at least a window positioned to make a charging indicator light 212 of a vaporizer inserted in the first channel 124 visible. A portion of interior of first channel 124 may be visible through first window when a vaporization device 200 is not inserted in first channel 124. At least a window may include, without limitation, a transparent portion of first lateral side 116 or a first lateral opening 136 in first lateral side 116. All or part of body 104 may be constructed from transparent material or materials. In an embodiment, window permits a user to view an indicator light 212 of vaporization device 200, for instance and without limitation to permit user to determine a charging state of vaporization device 200.

Referring again to FIG. 1, first lateral side 116 may include a first lateral opening 136. First lateral opening 136 may connect to interior of first channel 124, such that, for instance, an object inserted through first lateral opening 136 may enter the interior of the first channel 124 thereby; in other words, the first lateral opening 136 connects the first channel 124 to an exterior surface of the body 104. In an embodiment, first lateral opening 136 may include, be included in, or function as at least a window as described above; in other words, a user may be able to view an indicator light 212 of a vaporization device 200 inserted in first channel 124 through first lateral opening 136. First lateral opening 136 may further include an elongated gap in the first lateral side 116 running along longitudinal axis, for instance as illustrated in FIG. 1. Elongated gap may connect to first opening 128; in other words, where the first opening 128 includes a rim, the rim may be parted at a location at the end of the elongated gap, such that a cross-section of first channel 124 at the opening is an open cross-section, and such that an object inserted into internal space of the first channel 124 through elongated gap may be slid, thus inserted, through elongated gap and out of the first opening 128. Elongated gap may be wide enough to permit a fingertip of a user to contact the vaporization device 200 through the elongated gap; elongated gap may, for instance, be wide enough for a tip of a forefinger of an average adult male to be inserted therethrough. Elongated gap may, for instance, be at least 1 cm wide. Elongated gap may be sufficiently narrow to prevent vaporization device from being removable from first channel 124 except by sliding the vaporization device out through first opening 128. In an embodiment, a user may be able to contact a vaporization device 200 inserted in first channel 124 by inserting a fingertip or other item through elongated gap, and subsequently to slide finger along elongated gap while contacting the vaporization device 200, urging the vaporization device 200 outward through first opening 128 to eject it or to access mouthpiece 204 so as to inhale vapor therefrom.

Still referring to FIG. 1, first channel 124 may include a magnetic connection 140 at the terminal end 132, the magnetic connection 140 positioned to pull the vaporization device 200 toward the terminal end 132. Magnetic connection 140 may include, for instance, a magnet or a magnetic contact to securely hold a vaporization device 200 and/or charging contact thereof in place during charging. A vaporization device 200 may, for instance include a magnet or magnetic contact, and/or a piece of material that is attracted to magnets, which may couple with magnetic connection 140 to urge charging connection into electrical contact with charging component 144. In an embodiment, a combination of first channel 124 and magnetic connector allows for user to easily disengage a charging vaporization device 200 when they want to inhale, slide it along the channel, and then release it, allowing magnetic connection 140 to pull the electronic vaporizer back onto charging component 144 when released.

Figure 3:
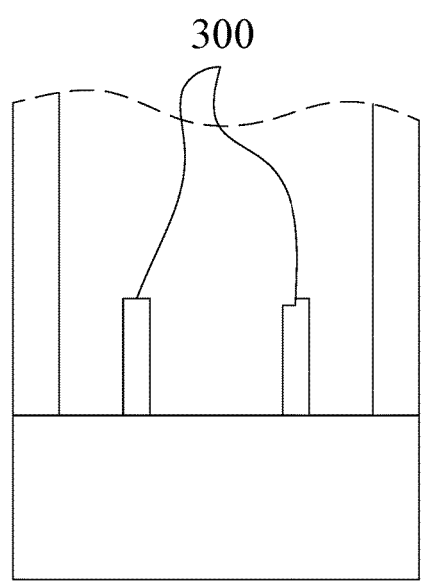
FIG. 3 is a schematic diagram of an embodiment of a charging component.

With continued reference to FIG. 1, recharging case 100 may include a charging component 144 located at terminal end 132 of first channel 124. Charging circuit may further include a first pair of electrical contacts configured to mate with a second pair of electrical contacts (not shown) of a charging connector 208 of a vaporization device 200 to complete a circuit. Referring now to FIG. 3, an exemplary embodiment of charging component 144 is illustrated. First pair of electrical contacts may include a pair of pins 300 oriented toward the proximal end 108; first pair of contacts may be configured to mate with contacts of a charging connection of a vaporization device 200 as described above in reference to FIG. 2. Thus, for instance, where a charging connector 208 of a vaporization device 200 includes two or more female connectors, charging component 144 may include two or more male connectors that insert into the two or more female connectors; where a charging connector 208 includes male connectors, charging component 144 may include female connectors into which the male connectors may insert. As a non-limiting example, charging component 144 may be configured such that when a vaporization device 200 is placed in contact with charging component 144 a first charging pin on the vaporization device 200 may contact a first charging contact on the charging component 144 and a second charging pin on the vaporization device 200 may contact a second charging contact on the charging component 144 or the first charging pin on the vaporization device 200 may contact a second charging contact on the charging component 144 and the second charging pin on the vaporization device 200 may contact the first charging contact on the charging component 144; the charging pins on the vaporization device 200 and the charging contacts on the charging component 144 may be in contact in any orientation. Charging pins on a vaporization device 200 and charging contacts on charging component 144 may be agnostic as to whether they are current inlets or outlets; each of the charging pins on the vaporization device 200 and the charging contacts on the charging component 144 may be negative or positive. Where a charging connector 208 includes conductive tabs or clips, charging component 144 may include conducting tabs, clips, or the like that contact the conductive tabs or clips upon insertion of a vaporization device 200 into first channel 124. Charging component 144 may include a printed circuit board or other assembly of circuit elements configured to convey electric power to charging connector 208; printed circuit board and/or other elements may be housed, without limitation in end-cap. Charging component 144 may be configured to complete a circuit with the charging connector 208 of the vaporization device 200 when the vaporization device 200 is inserted into the channel with the second end toward the distal end 112; circuit may be an electric circuit formed when contacts of charging connector 208 mate with contacts of charging component 144. Where charging component 144 is inductive, circuit may include a magnetic induction circuit as opposed to a direct electric circuit. Charging component 144 may be configured to charge the vaporization device 200 using electrical power from an integrated power storage device 148 as described below via the charging circuit and charging connector 208. In some cases charging component 144 may be configured to be a smart charger. In some cases, a vaporization device 200 may charge at a rate from 0.1 Amps or 0.5 amps up to about 2 amps (A), 4A, 5A, 6A, 7A, 10A, or 15A.

Referring again to FIG. 1, recharging case 100 includes an integrated power storage device 148 within the body 104, the integrated power storage device 148 electrically connected to the charging circuit. Integrated power storage device 148 may be a battery or a capacitor. In some cases, integrated power storage device 148 may be a rechargeable battery. Battery may include a lithium battery, which may include without limitation a lithium ion battery or a lithium polymer battery. Integrated power storage device 148 may be connected to one or more circuit elements configured to recharge integrated power storage device 148. Recharging case 100 may include a recharging port 152 in an exterior surface of the body 104, wherein the recharging port 152 is electrically connected to the integrated power storage device 148, and the recharging port 152 is configured to connect the integrated power storage device 148 to an external power source and to recharge the integrated power storage device 148. Recharging port 152 may include any suitable connector, including without limitation a micro-universal serial bus (USB) pot. Recharging case 100 may include at least a charge indicator light 156 electrically connected to the integrated power storage device 148, the at least a charge indicator light 156 configured to indicate a charging status of the integrated power storage device 148. For instance and without limitation, at least a charge indicator light 156 may include four indicator LEDs on the housing of the bottom portion which provide 25% incremental battery gauge readings.

Figure 4:
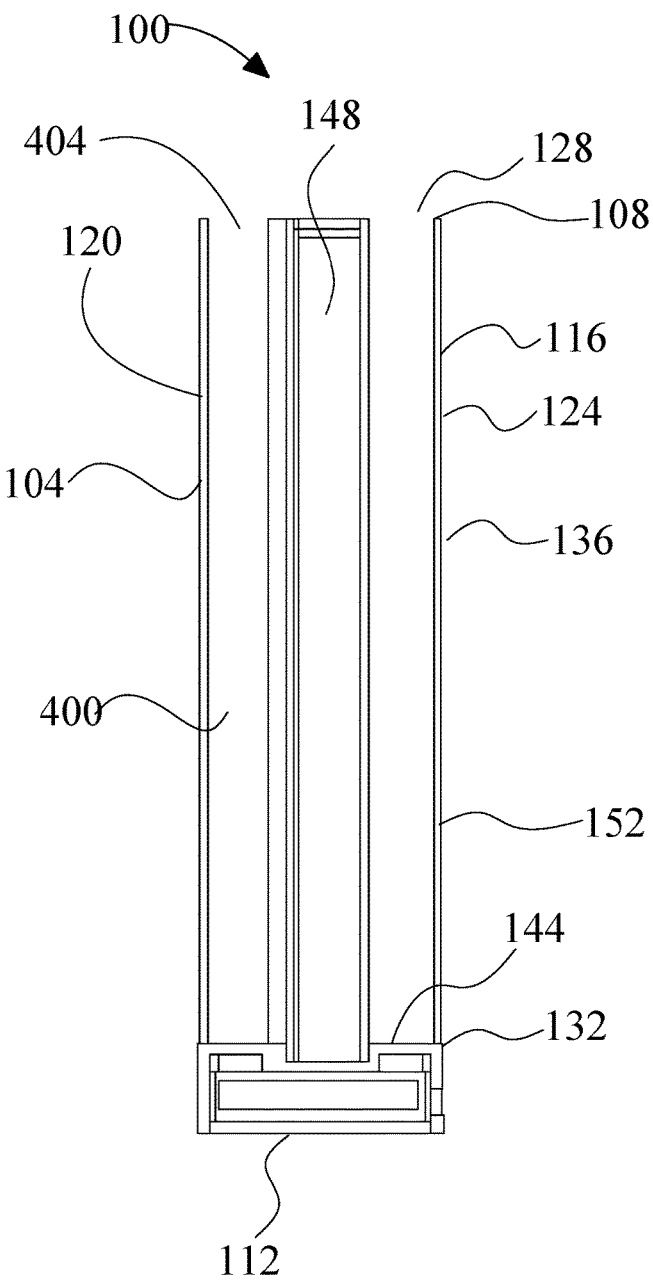
FIG. 4 is a cross-sectional diagram of an embodiment of a recharging case.

Referring now to FIG. 4, an exemplary embodiment of a cross-section of recharging case 100 is illustrated. As illustrated for instance in FIG. 4, integrated power storage device 148 may include, without limitation, a battery, which may be flattened, adjacent to the first channel 124. Battery may be located, for instance, in a central portion of body 104 between first lateral side 116 and second lateral side 120. Battery may occupy space from the proximal end 108 to the distal end 112 or may occupy only a portion of that length. Battery may include a single cell or a plurality of cells. In an embodiment, battery may not be flattened; battery may have any suitable alternative shape.

Still viewing FIG. 4, recharging case 100 may include a second channel 400 within the body 104 running along the longitudinal axis, the second channel 400 having a second opening 404 at the proximal end 108, the second channel 400 shaped to admit at least a refill cartridge for the vaporization device 200. In an embodiment, where first channel 124 is proximate to the first lateral side 116, second channel 400 may be proximate to the second lateral side 120. Integrated power storage device 148 may include a battery, which may be flattened, located between the first channel 124 and the second channel 400. Second channel 400 may have any form suitable for use as first channel 124 as described above in reference to FIG. 1. For instance, second channel 400 may have a flattened interior space shaped to admit a at least a refill cartridge having a flattened body 104. Second opening 404 may have any form suitable for the form first opening 128.

Figures 5, 6:
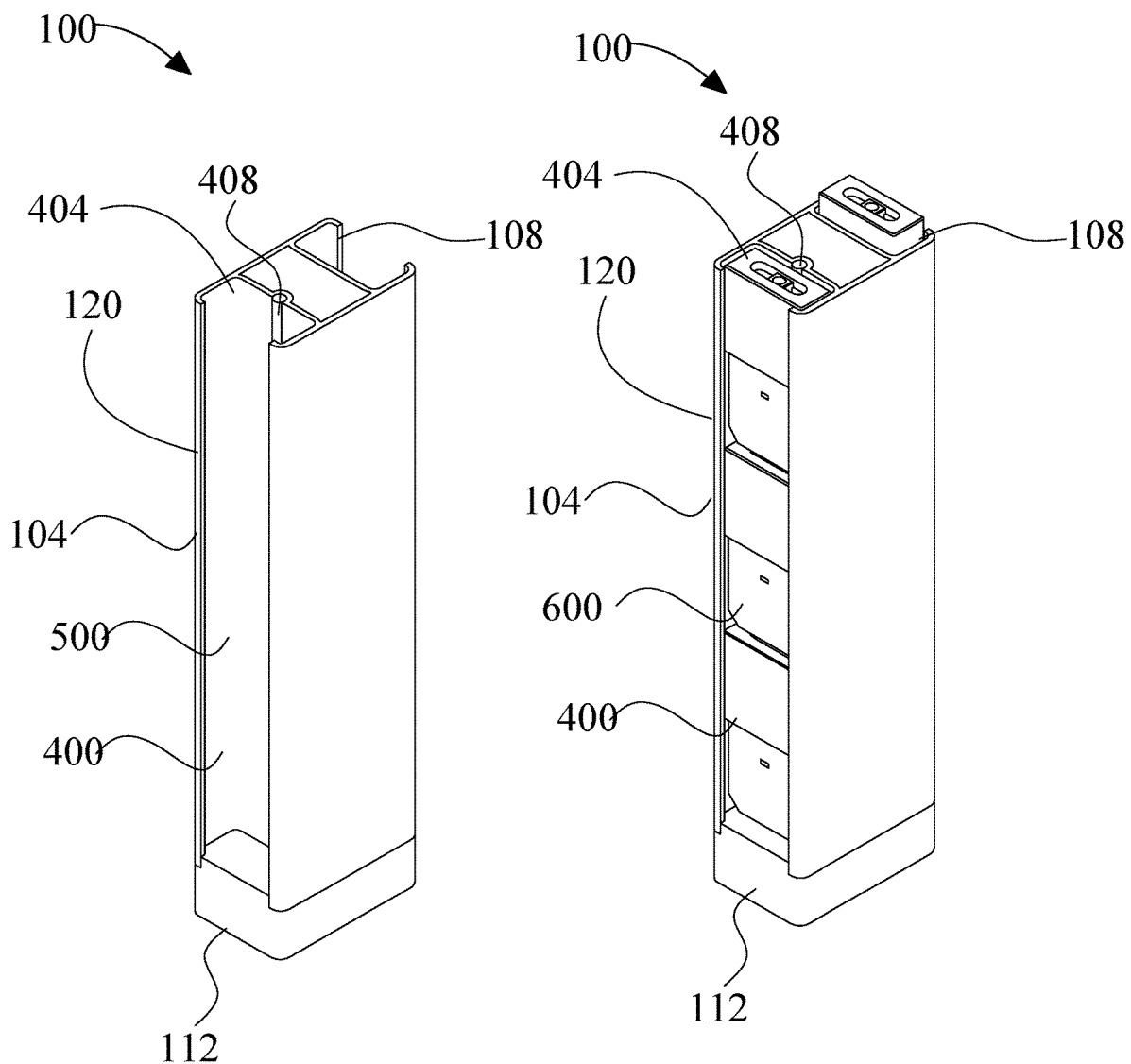
FIG. 5 is an isometric diagram of an embodiment of a recharging case.
FIG. 6 is an isometric diagram of an embodiment of a recharging case with cartridges.

Referring now to FIG. 5, an isometric view of an exemplary embodiment of recharging case 100 is presented. Second lateral side 120 may include a second lateral opening 500; opening may connect second channel 400 to an exterior surface of the body 104. Opening may have any form suitable for use as a first lateral opening 136 of first channel 124 as described above in reference to FIG. 1. For instance, and without limitation, second lateral opening 500 may include an elongated gap in the second lateral side 120 running along the longitudinal axis, for instance as described above for first lateral opening 136 on first lateral side 116. Elongated gap may connect to second opening 404, for instance as described above regarding elongated gap connecting to first opening 128. Elongated gap may be wide enough to permit a fingertip of a user to contact the at least a refill cartridge through the elongated gap. A user may, for instance, contact a cartridge stored in second channel 400 using a fingertip or other item and push the cartridge in the direction of second opening 404 using the fingertip or other item, ejecting the cartridge from the second channel 400; a user may then use the ejected cartridge to replace a cartridge in a vaporization device 200, such as without limitation a vaporization device 200 inserted in first channel 124. Cartridges stored in second channel 400 may include full cartridges and/or spent cartridges; the latter, for instance, may be saved for recycling, refilling, or other disposal.

Still referring to FIG. 5, second channel 400 may include one or more elements that act to hold one or more cartridges within second channel 400; one or more elements may use friction to hold cartridges in place. As a non-limiting example, one or more elements may include one or more pieces of elastomeric material that contact cartridges inserted in second channel 400; elastomeric material may include without limitation material made from one or more viscoelastic polymers, potentially with weak intermolecular forces, such as natural or synthetic rubbers, silicone, or the like. Persons skilled in the art, upon reviewing the entirety of this disclosure, will be aware of various elastomeric materials that may be suitable for use as one or more pieces. In an embodiment, one or more pieces of elastomeric material may be compressed or otherwise displaced by a cartridge inserted in second channel 400, causing the one or more pieces to push back against the cartridge with an elastic recoil force; as a result, the frictional contact between the elastomeric material and the cartridge, as well as between the cartridge and interior walls of second channel 400, may be enhanced, holding cartridge in place within second channel 400. As a non-limiting example, a friction rod may be disposed within the second channel 400, the friction rod positioned to contact the at least a refill cartridge and hold the at least a refill cartridge within the second channel 400. Friction rod may, for instance run along the longitudinal axis, in a direction along which cartridges may be slide through second channel 400, such that a cartridge anywhere within second channel 400 may be contacting friction rod. Friction rod may be cylindrical, and partially recessed into a wall of second channel 400; the wall may be the wall of second channel 400 nearest the first lateral side 116, when the second channel 400 is located proximate to the second lateral side 120. Friction rod may have any other suitable form and/or location within second channel 400. Friction rod may be formed of any elastomeric material as described above, including without limitation silicone. Alternatively or additionally, one or more projections, ridges, or bumps of material, which may not be elastomeric, projecting from interior walls of second channel 400, may act to block or check sliding motion of one or more cartridges inserted therein; for instance, a projecting bump in one or more interior walls of second chamber near to second opening 404 may prevent cartridges from sliding out of second channel 400.

Referring now to FIG. 6, an isometric view of an exemplary embodiment of recharging case 100 in which a plurality of cartridges 600 have been inserted in second channel 400 is illustrated. Cartridges may be inserted in any orientation, including with mouthpiece 204s facing second opening 404; cartridges may be visible and/or accessible through first lateral opening 136 as described above. A user may, upon using up a cartridge in a vaporization device 200, slide the vaporization device 200 fully or partially out of first channel 124, remove the spent cartridge, eject a new cartridge from second channel 400, fit the new cartridge into the vaporization device 200; the spent cartridge may be discarded, recycled, and/or inserted into the second channel 400. Second channel 400 may be used to store an assortment of cartridges having different flavors, active ingredients, or the like, two or more cartridges having identical vaporizable materials, or any other choice of cartridges appealing to the user.

Figure 7:
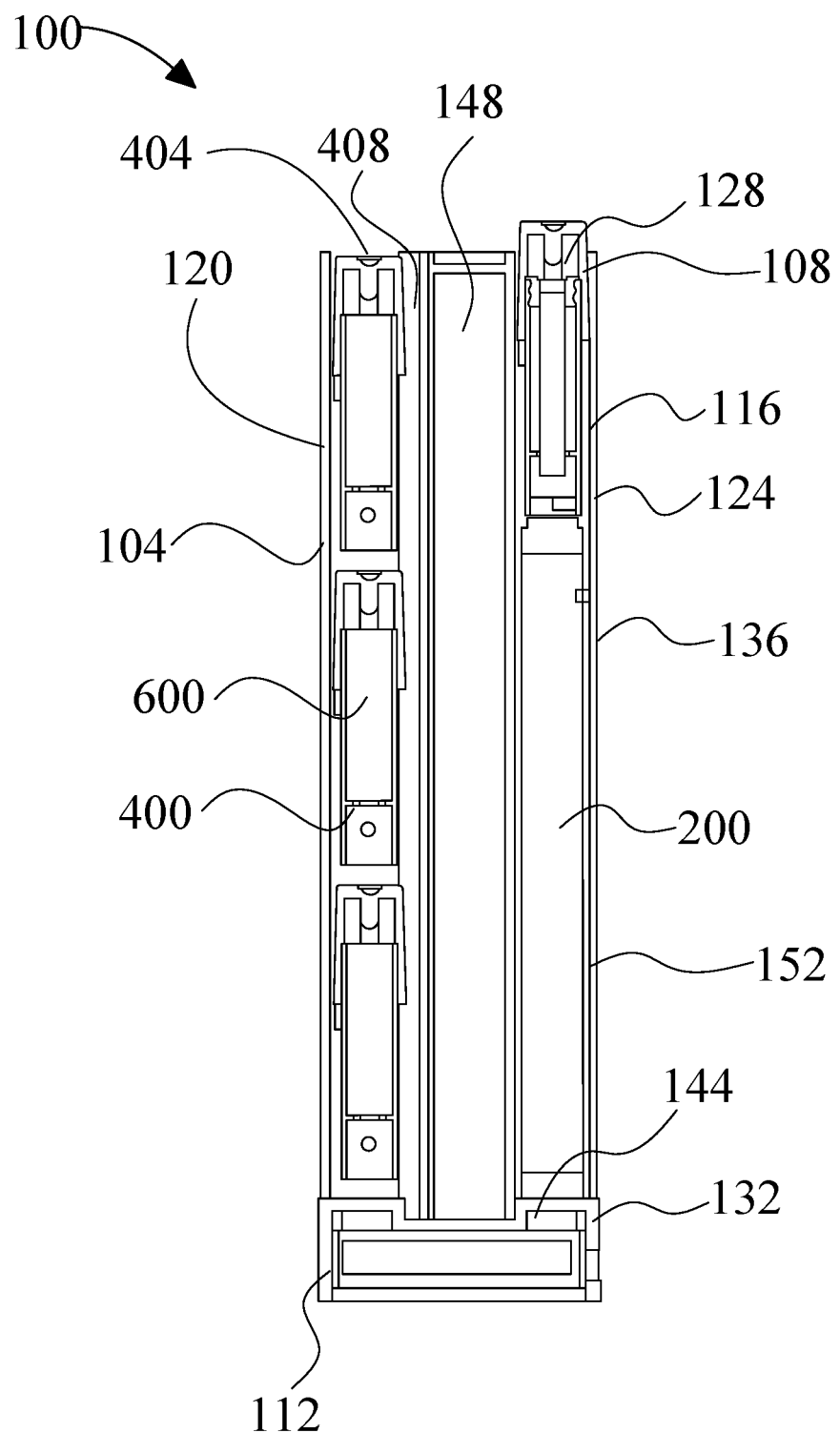
FIG. 7 is a cross-sectional diagram of an embodiment of a recharging case.

FIG. 7 is a cross-sectional view of an exemplary embodiment of recharging case 100 in which a vaporization device 200 is inserted in first channel 124 and a plurality of cartridges 600 is inserted in second channel 400. First channel 124 may be proximate to first lateral side 116. Second channel 400 may be proximate to second lateral side 120. Integrated power storage device 148 may be located within body 104 and between first channel 124 and second channel 400; in an embodiment, this arrangement enables a battery having substantial capacity to be stowed in a compact manner within body 104. Both integrated power storage device 148 and charging component 144 may connect to circuitry in end-cap and/or at bottom of body 104, which may also connect to charging port 152.

Figure 8:
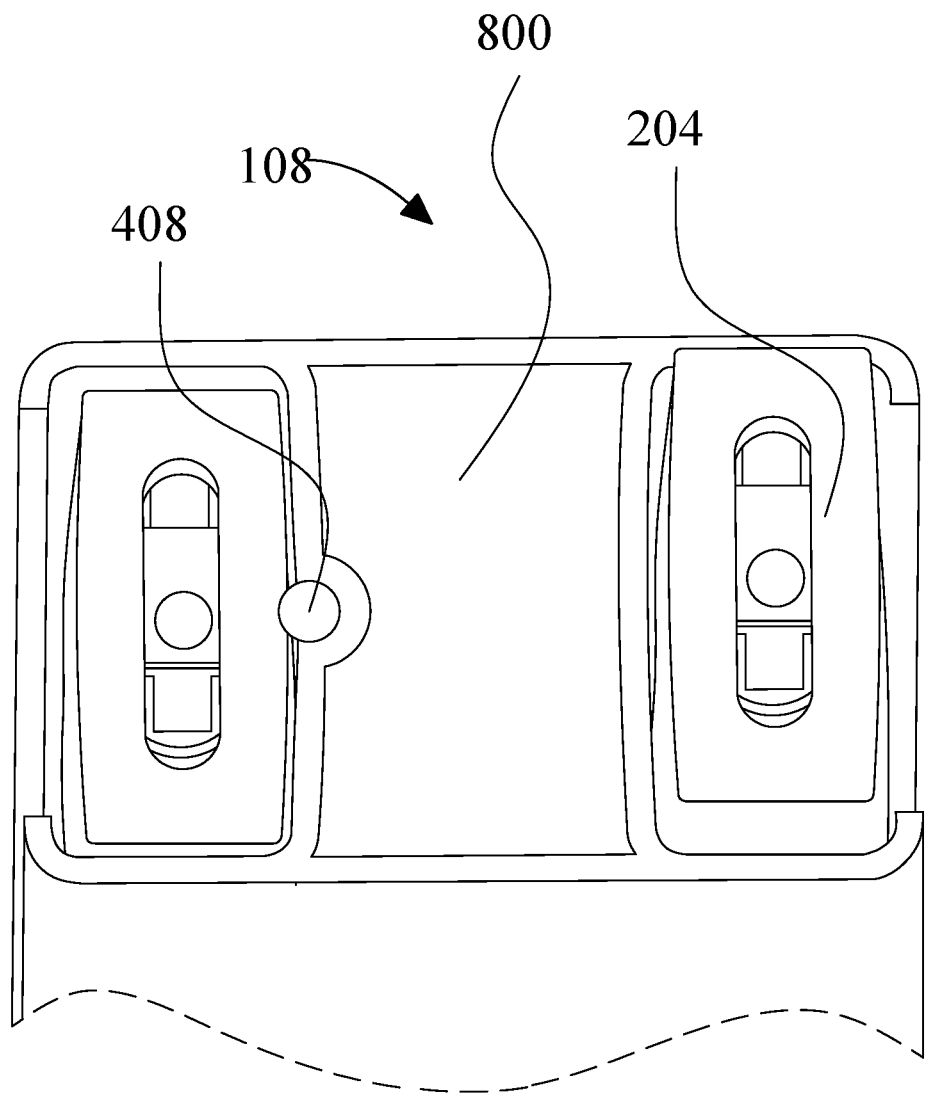
FIG. 8 is an isometric diagram of an embodiment of a detail of a proximal end of a recharging case.

FIG. 8 is an isometric view of a detail of an exemplary embodiment of proximal end 108 of recharging case 100. Proximal end 108 may include a battery cap that covers a chamber containing integrated power storage device 148. Battery cap may be constructed of any material or combination of materials suitable for use in construction of body 104, including without limitation ABS. A mouthpiece 204 of a vaporization device 200 inserted in first chamber may be visible and/or accessible at first opening 128. Friction rod, or an end of friction rod, may be visible at second opening 404.

In operation, a user may store a vaporization device 200 within first channel 124; while in first channel 124, a charging connector 208 of vaporization device 200 may be in electrical contact with charging component 144, permitting integrated power storage device 148 to provide electrical power to the vaporization device 200. Where present, a magnetic connector may maintain a charging connector 208 of a vaporization device 200 in contact with charging component 144. A user may view a charging status of a vaporization device 200 through at least a window and/or first lateral opening 136. A user may view a charging status of integrated power storage device 148 by referring to at least a charge indicator light 156; recharging case 100 may be recharged via charging port 152. A user may inhale the vaporized substance at the proximal end 108 of a vaporization device 200 by pulling the vaporization device 200 out through first opening 128 and inhaling; releasing vaporization device 200 may cause vaporization device 200 to retract into first channel 124 under the influence of gravity and/or magnetic connector. Use of recharging case 100 may provide user with a greatly extended battery life for vaporization device 200 by virtue of the additional electrical power supplied by integrated power storage device 148. Extended use may be further facilitated by refill cartridges kept in second channel 400.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A recharging case for use with a vaporization device, the recharging case comprising:
    a body having a proximal end, a distal end opposite the proximal end, a first lateral side, a second lateral side, and a longitudinal axis running from the proximal end to the distal end;
    a first channel within the body running along the longitudinal axis, the first channel having a first opening at the proximal end and a terminal end opposite the first opening;
    a charging component located at the terminal end of the first channel; and
    an integrated power storage device within the body, the integrated power storage device electrically connected to the charging component;
    wherein:
    the first channel is shaped to slidably admit a vaporization device having a mouthpiece at a first end and a charging connector at a second end;
    the charging component is configured to complete a circuit with the charging connector of the vaporization device when the vaporization device is inserted into the channel with the second end toward the distal end; and
    the charging component is configured to charge the vaporization device using electrical power from the integrated power storage device via the charging component and charging connector;
    further comprising a second channel within the body running along the longitudinal axis, the second channel having a second opening at the proximal end, the second channel shaped to admit at least a refill cartridge for the vaporization device;
    wherein the first channel is proximate to the first lateral side and the second channel is proximate to the second lateral side;
    and wherein the second lateral side further comprises an opening, and the opening connects the second channel to an exterior surface of the body.

2. The recharging case of claim 1, wherein the body further comprises an end cap attached at the proximal end of the body, the end cap blocking the terminal end of the first channel.

3. The recharging case of claim 1, wherein the first channel is closed at the terminal end.

4. The recharging case of claim 1, wherein the first channel has a flattened interior space shaped to admit a vaporizer having a flattened body.

5. The recharging case of claim 1 wherein the first channel is located proximate to the first lateral side.

6. The recharging case of claim 5, wherein the first lateral side further comprises at least a window positioned to make a charging indicator light of a vaporizer inserted in the first channel visible.

7. The recharging case of claim 5, wherein the first lateral side further comprises a lateral opening, and the opening connects the first channel to an exterior surface of the body.

8. The recharging case of claim 7, wherein the lateral opening further comprises an elongated gap in the lateral running along the longitudinal axis.

9. The recharging case of claim 8, wherein the elongated gap connects to the first opening.

10. The recharging case of claim 1, wherein the first channel further comprises a magnetic connection at the terminal end, the magnetic connection positioned to pull the vaporization device toward the terminal end.

11. The recharging case of claim 1, wherein the charging component further comprises a first pair of electrical contacts configured to mate with a second pair of electrical contacts of the charging connector of the vaporization device to complete a circuit.

12. The recharging case of claim 11, wherein the first pair of electrical contacts further comprises a pair of pins oriented toward the proximal end.

13. The recharging case of claim 1, wherein the integrated power storage device further comprises a battery adjacent to the first channel.

14. The recharging case of claim 1, wherein the integrated power storage device further comprises a battery located between the first channel and the second channel.

15. The recharging case of claim 14, wherein the second channel has a flattened interior space shaped to admit at least a refill cartridge having a flattened body.

16. The recharging case of claim 1, wherein the opening further comprises an elongated gap in the second lateral side running along the longitudinal axis.

17. The recharging case of claim 1, wherein the second channel further comprises a friction rod disposed within the second channel, the friction rod positioned to contact the at least a refill cartridge and hold the at least a refill cartridge within the second channel.

* * * * *